July 24, 1934.　　　G. C. SPRAGUE　　　1,967,978
MILK CONTAINER
Filed April 3, 1933
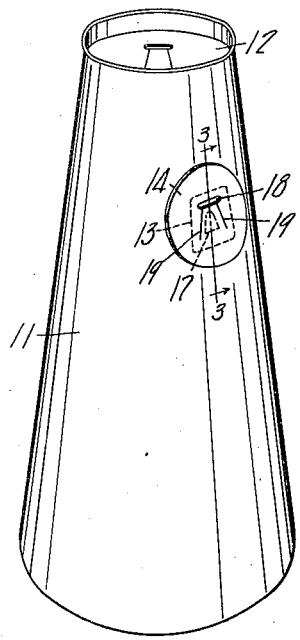
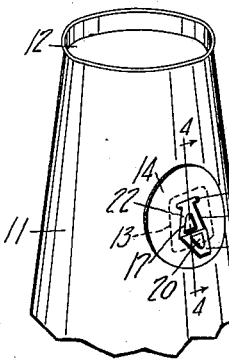
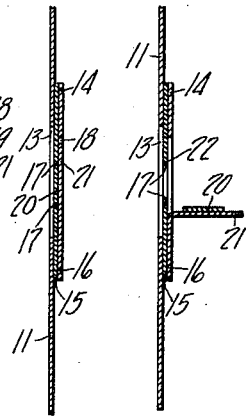
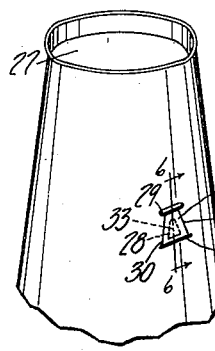
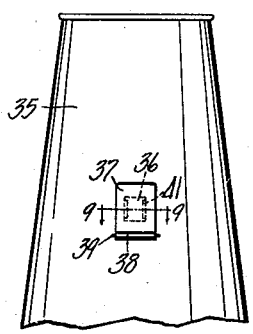
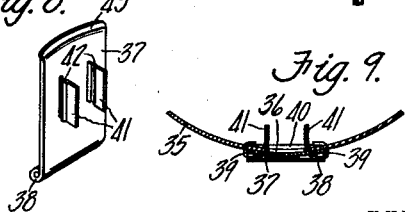
INVENTOR.
George C. Sprague.
BY
ATTORNEY.

Patented July 24, 1934

1,967,978

UNITED STATES PATENT OFFICE 1,967,978

MILK CONTAINER

George C. Sprague, Lockport, Ill.

Application April 3, 1933, Serial No. 664,173

2 Claims. (Cl. 229—7)

The invention relates to milk containers, and has for its principal object to provide a milk container for retail use from which cream, which collects in the upper portion of the container, may be readily drawn.

A further object of the invention is to provide a milk container having a closure disposed adjacent the cream line thereof which may be opened to permit the cream in the container to be drawn therefrom, and which may be reclosed to seal the container to prevent contamination of the milk remaining therein.

A further object is to provide a milk container with a closure in the side thereof which forms a spout when opened.

A further object is to provide a milk container having a closure in the side thereof provided with means normally engaging the container to maintain the closure in operative closed position.

With the above and other objects in view, the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:

Figure 1 is a perspective view of the container.

Figure 2 is a fragmentary perspective view of the container with the closure element in open position.

Figure 3 is a vertical sectional view of the container taken on line 3—3 of Figure 1.

Figure 4 is a vertical sectional view of the container taken on line 4—4 of Figure 2.

Figure 5 is a fragmentary perspective view of a modified form of container.

Figure 6 is a vertical sectional view of the container taken on line 6—6 of Figure 5 and illustrating the closure in open position.

Figure 7 is a view in side elevation of another modified form of the container.

Figure 8 is a perspective view of the closure element employed in the container illustrated in Figure 7.

Figure 9 is a fragmentary horizontal transverse sectional view of the container taken on line 9—9 of Figure 7.

Referring to the drawing, and particularly to Figures 1 to 4 thereof, the numeral 11 designates a conventional milk container of the non-refillable type which is formed of waxed paper or other suitable material provided with a conventional cap 12 which seals the upper end thereof. In the side of the container at the point of separation of the cream and milk in the container is formed an opening 13. Adhesively secured to the container at the outer side thereof to cover opening 13 is a closure 14, preferably formed of a double ply paper or other fibrous material, the inner ply being numbered 15 and the outer ply 16. The inner ply 15 is scored at 17 to outline an opening therein; and the outer ply 16 is cut-away at 18 above score 17 and is provided with a pair of downwardly extending score lines 19 extending from said cut-away 18 in laterally outwardly spaced relation to score 17. The scores 17 and 19 provide closure portions 20 and 21, respectively, therewithin, which are firmly secured together in face contacting relation.

The container is effectively sealed by cap 12 and closure 14 when delivered to the consumer to comply with the requirements of sanitation and milk protection. Should the consumer desire to draw the cream collected at the top of the container for use separate from the milk remaining, the closure in the side of the container may be opened. This is accomplished by inserting the finger nail or a knife in the cutout 18 to pry up the closure portion 21 to break the closure 14 along score lines 17 and 19 and thereby open the container. The closure tab 21 is then bent down at an angle to the side of the container and forms a spout to direct the cream which drains from the container through the opening therein so formed into a suitable receptacle (not shown) positioned to receive the cream from the spout. After the cream has been drained from the container, the tab 21 is returned to its normal closing position where it is held by the engagement of its edges with the scored edges 19 of the opening and by the interengagement of the edges of the inner closure portion 21 with the scored edges 17 of the opening in the inner ply 15 of closure 14. It will be observed that the edges of the opening in inner ply 15 are inwardly spaced from the edges of the outer closure tab 21 to provide a shoulder 22 in closure 14, which shoulder 22 enhances the seal effected by the repositioning of tabs 20 and 21. It will also be observed that when the cream has been drained from the container in this manner, no liquid pressure is exerted upon the re-effected seal provided by tabs 20 and 21, so that said seal is required only to be effective to prevent access of dirt or dust to the remainder of the contents of the container. The remainder of the milk in the container may then be emptied, when desired, through the upper end of the container upon removal of cap 12, or by reopening closure tabs 20 and 21 and tipping the container to permit draining of the milk through the opening in the side of the container.

In Figures 5 and 6 are illustrated another type of non-refillable paper container formed of inner and outer plies 25 and 26, respectively, and provided with an upper open end which is adapted to be closed by a conventional cap 27. The inner ply 25 of the container is scored at 28; and the outer ply 26 is provided with a cut-out 29 above score 28 and score lines 30 extending downwardly therefrom on opposite sides of score 28. A staple 31 is secured to the side of the container at the lower end of score lines 30. The portion or tab 32 defined by cut-out 29, scores 30 and staple 31 may be torn from the outer ply 26 and bent over the staple 31 to form a spout, in the same manner as in the previous construction. The portion 33 of ply 25 defined by score 28 is adhesively secured to tab 32 and is torn along score 28 by the tearing of tab 32. This construction is thus similar to the previous construction in its use, and differs therefrom in eliminating the separate closure element by the scoring, etc., of the container per se; and by the use of the reinforcing staple to limit the tearing of tab 32, which staple obviously might also be used with a construction employing a separate closure element, as in Figure 1.

In Figures 7, 8 and 9 are illustrated another construction of container, illustrated to be of the non-refillable type, but which may equally well be of the refillable type. The container 35 is provided with an opening 36 in its side at about the cream line of the container. A metallic or other plate 37 having a lateral curvature conforming to the curvature of the side of the container for the major portion of its height is disposed to cover opening 36. The lower end of the plate 37 is provided with an outwardly bent hinge socket 38 through which a staple 39 extends. The staple 39 is secured to the container to tightly hold the lower end of the plate 37 thereagainst, and serves to slightly deform the container at its point 40 of connection with the container. A pair of vertical spring tabs 41 project from the inner face of plate 37, and are spaced apart a distance equal to the spacing of the side edges of opening 36. Outwardly directed vertical off-sets 42 are formed in tabs 41 in closely spaced relation to plate 37. An outwardly directed lip 43 is preferably provided at the outer end of plate 37.

The plate 37 serves normally to seal the container, being held in face contacting relation thereto by the off-sets 42 which engage the inner side of the container at the edges of opening 36. To open the container, the lip 43 is readily grasped, and the plate 37 is pivoted to desired position about staple 39. The staple 39 exerts a firm frictional grip on socket 38 to tightly hold plate 37 against the container, and this grip serves to maintain the position of the plate 37 as set to provide a spout extending at any desired angle relative to the container. The container may be reclosed by pivoting the plate 37 to a position in face contacting engagement therewith, the tabs 41 flexing to permit engagement of the off-sets 42 behind the edges of the opening in the manner previously described.

The invention having been set forth, what is claimed as new and useful is:—

1. A milk container formed of fibrous material, said container having a portion thereof spaced below the top of said container formed of a double ply construction, the inner ply of said container being provided with an endless score, the outer ply of said container being scored at a point spaced outwardly of said first named score, the contacting portions of said plies defined by the score of the inner ply being adhesively secured together and said plies being tearable along said scores to provide an opening in said container and a spout projecting angularly of said container below said opening, said spout and opening permitting the upper portion of the contents of said container to drain therefrom in a directed flow, said torn portions being reinsertible in said opening to be held therein by the interengagement of the torn edges thereof to seal said container against contamination of the contents thereof.

2. A milk container formed of fibrous material, said container having a portion thereof in spaced relation below the top thereof formed of double ply construction, a portion of the outer ply being cut-away, spaced score lines extending from said cut-away, said inner ply being provided with an endless score positioned in inwardly spaced relation to said cut-away and outer scores, the portion of said inner ply defined by said score being adhesively secured to said outer ply, said cut-away and outer scores defining a tab which is tearable along said outer scores and bendable to a position angular of said container, the portion of said inner ply defined by said inner score being torn therefrom by the tearing of said outer ply whereby the tearing of said outer tab forms an opening in said container, said torn portions being reinsertible in said opening to be held in operative relation thereto by the interengagement of the torn edges thereof and of said opening.

GEORGE C. SPRAGUE.